(12) United States Patent
Shahraray et al.

(10) Patent No.: US 11,196,669 B2
(45) Date of Patent: Dec. 7, 2021

(54) NETWORK ROUTING OF MEDIA STREAMS BASED UPON SEMANTIC CONTENTS

(71) Applicant: AT&T Intellectual Property I, L.P., Atlanta, GA (US)

(72) Inventors: Behzad Shahraray, Holmdel, NJ (US); Eric Zavesky, Austin, TX (US); Bernard S. Renger, New Providence, NJ (US); David Crawford Gibbon, Lincroft, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 217 days.

(21) Appl. No.: 15/981,999

(22) Filed: May 17, 2018

(65) Prior Publication Data

US 2019/0356588 A1    Nov. 21, 2019

(51) Int. Cl.
*G06F 15/167* (2006.01)
*H04L 12/721* (2013.01)
*G06N 3/08* (2006.01)
*G06K 9/00* (2006.01)

(52) U.S. Cl.
CPC .............. *H04L 45/70* (2013.01); *G06N 3/08* (2013.01); *G06K 9/00718* (2013.01); *G06K 2009/00738* (2013.01)

(58) Field of Classification Search
CPC ...... H04L 45/70; G06N 3/08; G06K 9/00718; G06K 2009/00738
See application file for complete search history.

(56) References Cited

U.S. PATENT DOCUMENTS

| 5,621,889 A | 4/1997 | Lermuzeaux |
| 7,499,903 B2 | 3/2009 | Nevin |
| 7,747,697 B2 | 6/2010 | Hoshiai |
| 7,904,545 B2 | 3/2011 | Golovchinsky |
| 8,154,578 B2 | 4/2012 | Kurtz |
| 8,515,241 B2 | 8/2013 | Forsyth |

(Continued)

FOREIGN PATENT DOCUMENTS

| CN | 102883400 A | 11/2014 |
| WO | WO2014190603 A1 | 12/2014 |
| WO | WO2017186916 A1 | 11/2017 |

OTHER PUBLICATIONS

Jabeur Nafaa, et al., "Semantics and routing in wireless sensor networks: challenges and opportunities." Information Infrastructure Symposium, 2009. GIIS'09, Global, IEEE, 2009, 6 pages, https://www.researchgare.net/profile/Nafaa_Jabeur2/publication/224611297_Semantics_and_routing_in_wireless_sensor_networks_Challenges_and_opportunities/links/551e84980cf213ef063f6aee/Semantics-and-routing-in-wireless-sensor-networks-Challengesand-opportunities.pdf?origin=publication_list.

(Continued)

*Primary Examiner* — John B Walsh
*Assistant Examiner* — Stephen J Houlihan (57) ABSTRACT

Methods, computer-readable media, and devices are disclosed for routing media streams to destination devices based upon semantic contents detected in the media streams. For example, a method may include a processing system including at least one processor detecting a first semantic content in a media stream of a media source device in accordance with a machine learning model for detecting the first semantic content, selecting a first destination device for the media stream based upon the first semantic content, and sending the media stream to the first destination device that is selected.

20 Claims, 3 Drawing Sheets

(56) References Cited

U.S. PATENT DOCUMENTS

| | | |
|---|---|---|
| 8,620,028 B2 | 12/2013 | Eaton |
| 8,848,057 B2 | 9/2014 | Xu |
| 9,271,133 B2 | 2/2016 | Rodriguez |
| 9,442,930 B2 | 9/2016 | Szucs |
| 9,525,696 B2 | 12/2016 | Kapoor |
| 9,692,984 B2 | 6/2017 | Lord |
| 9,763,093 B2 | 9/2017 | Richards |
| 9,781,016 B1 | 10/2017 | Marquardt |
| 2006/0251382 A1 | 11/2006 | Vronay |
| 2013/0100268 A1* | 4/2013 | Mihailidis .......... G08B 21/0492 348/77 |
| 2014/0267714 A1 | 9/2014 | Mistry |
| 2015/0195587 A1* | 7/2015 | Tsukagoshi ........ H04N 21/2362 725/116 |
| 2015/0248917 A1 | 9/2015 | Chang |
| 2016/0171369 A1 | 6/2016 | Majumdar |
| 2016/0350597 A1* | 12/2016 | Bataller ............. G06K 9/00718 |
| 2017/0032266 A1 | 2/2017 | Gopalakrishnan |
| 2017/0187593 A1 | 6/2017 | Balasubramanian |
| 2017/0244614 A1 | 8/2017 | Wu |
| 2017/0255829 A1 | 9/2017 | Chang |
| 2018/0103052 A1 | 4/2018 | Choudhury |
| 2019/0327183 A1* | 10/2019 | Ward ...................... H04L 47/80 |

OTHER PUBLICATIONS

Huang, Yi-an, et al. "Cross-feature analysis for detecting ad-hoc routing anomalies." Distributed Computing Systems, 2003. Proceedings. 23rd International Conference on. IEEE, 2003, 25 pages, https://www.cc.gatech.edu/home/wenke/papers/icdcs.pdf.

Trajkovska, Irena, et al. "SDN-based service function chaining mechanism and service prototype implementation in NFV scenario." Computer Standards & Interfaces 54 , Jan. 2017, pp. 247-265. https://www.researchgate.net/profile/George_Xilouris/publication/312686769_SDNbased_Service_Function_Chaining_Mechanism_and_Service_Prototype_Implementation_in_NFV_scenario/links/5a0c572fa6fdcc39e9bf6395/SDN-based-Service-Function-Chaining-Mechanism-and-Service-Prototype-Implementation-in-NFV-scenario.pdf.

Liu, Chang, et al. "Piggybacking network functions on SDN reactive routing: A feasibility study." Proceedings of the Symposium on SDN Research. ACM, Apr. 3-4, 2017, 7 pages, http://conferences.sigcomm.org/sosr/2017/papers/sosr17-piggybacking.pdf.

* cited by examiner

NETWORK ROUTING OF MEDIA STREAMS BASED UPON SEMANTIC CONTENTS

The present disclosure relates generally to streaming media distribution networks, and more particularly to devices, computer-readable media, and methods for routing media streams to destination devices based upon semantic contents detected in the media streams.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure discloses a method, computer-readable medium, and device for routing media streams to destination devices based upon semantic contents detected in the media streams. For example, a method may include a processing system including at least one processor detecting a first semantic content in a media stream of a media source device in accordance with a machine learning model for detecting the first semantic content, selecting a first destination device for the media stream based upon the first semantic content, and sending the media stream to the first destination device that is selected.

In accordance with the present disclosure, a media stream, such as a video and/or audio stream, is routed based upon one or more semantic contents in the media stream. In addition, detection of semantic content can trigger additional analytics (e.g., recognition) or alerts, such as sending a request for physical help. In one example, the system may learn ideal or preferred content routes for dynamic, parallel routing of content based on a final task as an alternative or in addition to rule-based matching. The system may also trigger dynamic routing and retrieval of secondary informational assets (e.g., historical video, informational content, etc.) in accordance with the semantic content(s) in the current media stream. In one example, the media stream routing of the present disclosure enhances the capability of a software defined network (SDN) by optimizing routing using high-level features instead of based upon more simple network rulesets.

In particular, examples of the present disclosure provide a dynamic routing system for a media stream based on the actual audio, visual, or other semantics within the media stream. The present examples include: real-time partitioning of content based on detected actions, objects, or other types of semantic contents, on-demand retrieval and aggregation of historical content (including from unrelated sources) for insights and comparisons, and parallel and staged-serial routing of media streams (through alternate network paths, devices, sensors, etc.) to connect needed experts to address a detected semantic content within the content, to provide additional processing of the media stream, and so forth.

Always-on systems and mobile sensor networks are increasingly being deployed but may be poorly managed in terms of routing structures. In contrast, the present examples quickly find the right person or group to receive a media stream, reduce unnecessary human monitoring, and reduce latency for addressing media processing results, e.g., first responder deployment. In various examples, media streams may be redirected based on security considerations or for increased precision, and so on. Examples of the present disclosure may also impose privacy and access controls, e.g., providing a need-to-know based routing. In addition, examples of the present disclosure can partition content (or trigger loading of historical content) based on detected actions and semantics, and/or reroute according to the detected semantic content(s).

Examples of the present disclosure may be used in a variety of different scenarios. For instance, one example may relate to cell tower monitoring and repair, where a camera may be directed at a cell tower. In one example, the system may monitor the video stream and partition the stream based upon semantic contents detected in the video stream. In one example, the system may also collect additional sensor data, such as moisture measurements, wind speed measurements, temperature measurements, etc. For instance, a semantic content of "fire" may be detected from a video stream, but the camera may be directed at a large area of forest. In one example, the location may then be more accurately determined from smoke and/or temperature sensors that may be deployed in the area, or the existence of a fire may be confirmed from such sensor measurements.

The system may provide for parallel routing and/or parallel processing of the video stream for different semantic contents that may be detected, such as particular objects, particular types of objects, particular characteristics of objects, particular events, particular conditions, specific personnel, and so forth. In one example, video streams from multiple source cameras may be used to augment processing across different views. For instance, detection of a particular semantic content (e.g., a specific type of object) may be confirmed or the confidence of detection may be increased when the same semantic content is detected in multiple video streams of the same area, such as videos streams from multiple cameras directed at a cell tower from different positions and angles. In one example, detection of a semantic content may also trigger a look-back at the past X number of seconds or minutes of the media stream, e.g., to activate detection processes for additional semantic contents, to collect portions of the media stream prior to the detection of the semantic content for sending to a recipient in accordance with a routing decision based upon the semantic content, and so on.

In one example, detection of a human presence (e.g., a semantic content of a "person") in a video or image stream may trigger activation of a facial recognition service, or routing to a facial recognition service at another device. In addition, the detection of known individuals may further result in differentiated routing of the media stream to one or more destination devices, or may be provided as additional information to a destination device along with the video stream. For instance, the media stream and identification of a known individual (e.g., a known individual of interest, such as a suspect or a missing individual) may be routed to device(s) of one or more security personnel.

In one example, a detection of a semantic content in a media stream may cause activation of additional cameras, microphones, or sensors that were previously inactive, may cause the reorientation of one or more cameras, may cause the automatic deployment or repositioning of a drone, e.g., to capture additional video, audio, or other measurements of an object and/or an environment, and so forth. In each case, the action(s) taken may depend upon the particular semantic content(s) that is/are detected and a set of one or more actions that the system is configured to implement in response to the semantic content(s). In one example, the system may learn over time what content is utilized by whom, or by which devices or services, and then implement automated rerouting of media stream(s) in accordance with the learned behaviors. For example, the system may monitor whether additional retrievals of media streams occur, whether particular individual recipients or groups ignore or dismiss a routed media stream, etc., and adapt proposed routes for subsequent encounters of the same semantic content(s).

In another example, the present disclosure may relate to satellite imagery analysis. For instance, a system may analyze satellite image content to identify semantic contents. The semantic contents may be detected from one or more images and/or detected as differences from historical images (e.g., impacts from geological or weather related events such as flooding, landslide, drought, earthquake, volcano eruption, or deployment of new buildings, new equipment, etc.). In one example, the satellite images may be processed or rerouted to resize the images, to archive the images, to route the images through lower bandwidth paths or higher bandwidth paths (e.g., depending upon the urgency in accordance with the detected semantic content(s)), and so forth. In one example, unidentified anomalies may be detected and the satellite images routed to a designated recipient or group of recipients for labeling or for dismissal as unimportant. For anomalies that are labeled, these may then comprise new semantic contents that may be detected in subsequent satellite imagery and routed accordingly. For example, the routing may be specified by one of the recipients or by other personnel, and programmed into the system for future routings. Alternatively, or in addition, the system may learn a routing behavior for the semantic content(s) based upon who or what devices are designated as additional recipients, or are detected to access the satellite imagery containing the semantic content(s) over time.

In still another example, semantic content-based routing of a media stream may be first activated by a predefined activation action or trigger event, e.g., a gesture-based trigger. For instance, an always-on camera in a home may generate a video stream with parents and children, but may also have large portions of time where there is nothing in the video stream but a quiet room. However, the parents may decide that certain portions of the video (e.g., including specific semantic contents) should be streamed to grandparents. Accordingly, in one example, a predefined gesture may activate semantic content detection. Then, the system may look for specific semantic contents, such as a given grandchild's face, and only then an associated routing action may be taken, e.g., to only route the media stream to grandparents when the grandchild is detected in the video. In one example, a default setting may be to route a 1 minute portion of the video stream to the grandparents. However, an additional gesture detected in the video stream may cause additional portions of the video stream to continue to be routed, or may cause the semantic content detection and routing process to remain active. In one example, the system may also use a general facial detection process to obscure images of individuals (e.g., friends of the grandchild playing in the grandchild's home) who have not consented to have their images transmitted via the network, uploaded to publicly accessible media source, etc.

It should be noted that a semantic content, or semantic field is a common idea or common meaning shared by all words, phrases and/or lexemes in a lexical field. In accordance with the present disclosure, semantic contents are formalized. For example, a list of semantic contents (or text labels) are stored in a database. In addition, signatures (e.g., machine learning models) characterizing the semantic contents may be stored along with the text labels of such semantic contents in the database. While media content may contain thousands of different semantic contents, it is those stored in the database that may be detected in the media content and processed in accordance with the present disclosure. Thus, for example, a service for routing a video stream to grandparents may have active machine learning models for detecting different semantic contents as compared to a service that is addressing premises security, cell tower maintenance, traffic safety, and so forth.

It should also be noted that examples of the present disclosure relate to various types of media content including video, still images, and audio. To illustrate, a camera may be directed at a roadway and capture video of an accident. In addition, the accident may be identified as a semantic content (e.g., "car accident") in the video. For video streams, each semantic content may be associated with a signature, e.g., a set of features that defines and/or identifies the semantic content. For instance, a signature for a semantic content may include visual features comprising or derived from low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. A signature may also include visual features relating to movement in a video, changes within images and between images in a sequence (e.g., video frames or a sequence of still image shots), such as color histogram differences or a change in color distribution, edge change ratios, standard deviation of pixel intensities, contrast, average brightness, and the like. In one example, the system may perform an image salience detection processes, e.g., applying an image salience model and then perform an image recognition algorithm over the "salient" portion of the image(s). Thus, in one example, visual features may also include a recognized object, a length to width ratio of an object, a velocity of an object estimated from a sequence of images (e.g., video frames), and so forth.

A signature for a semantic content may also include low-level audio features such as: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional audio features may also include high-level features, such as: words and phrases. For instance, one example may utilize speech recognition pre-processing to obtain an audio transcript and to rely upon various keywords or phrases as data points. The signature for a semantic content may thus depend upon the type of media stream at issue, the media stream preprocessing services that are available and/or in use (e.g., the "features" that are available for selection in comprising a signature and for detection of a semantic content), the nature of the semantic content (e.g., "shouting" or "crying of a child" versus "tree rustling," "ball bouncing", "running steps", etc.), and so forth.

In accordance with the present disclosure, the signature for a semantic content may comprise a machine learning model (MLM) that is trained based upon the plurality of features available to the system (e.g., a "feature space"). For instance, one or more positive examples for a semantic content may be applied to a machine learning algorithm (MLA) to generate the signature (e.g., a MLM). In one example, the MLM may comprise the average features representing the positive examples for a semantic content in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on.

In one example, a signature for a semantic content may include those features which are determined to be the most distinguishing features of the semantic content, e.g., those features which are quantitatively the most different from what is considered statistically normal or average from a source of the media content and/or from other semantic contents that may be detected via a same system, e.g., the top 20 features, the top 50 features, etc. In one example, the signature for a semantic content (e.g., a MLM) may be deployed in a media source device and/or in a network-based device to process media streams from one or more media sources, and to identify patterns in the features of the media stream(s) that match the semantic content signature. In one example, a match may be determined using any of the visual features and/or audio features mentioned above. For instance, a match may be determined when there is a threshold measure of similarity among the features of the media streams(s) and the semantic content signature. In one example, the media streams(s) may be analyzed using a time-based sliding window, extracting features, and comparing the features to the semantic content signature. In all of the foregoing examples, routing is primarily based upon semantic contents detected in the media streams. However, it should be understood that the routing decisions based upon detected semantic contents may further vary depending upon the time of day, day of week, network traffic (e.g., for load balancing, congestion routing, etc.), and other factors. These and other aspects of the present disclosure are discussed in greater detail below in connection with the examples of FIGS. 1-3.

Figure 1:
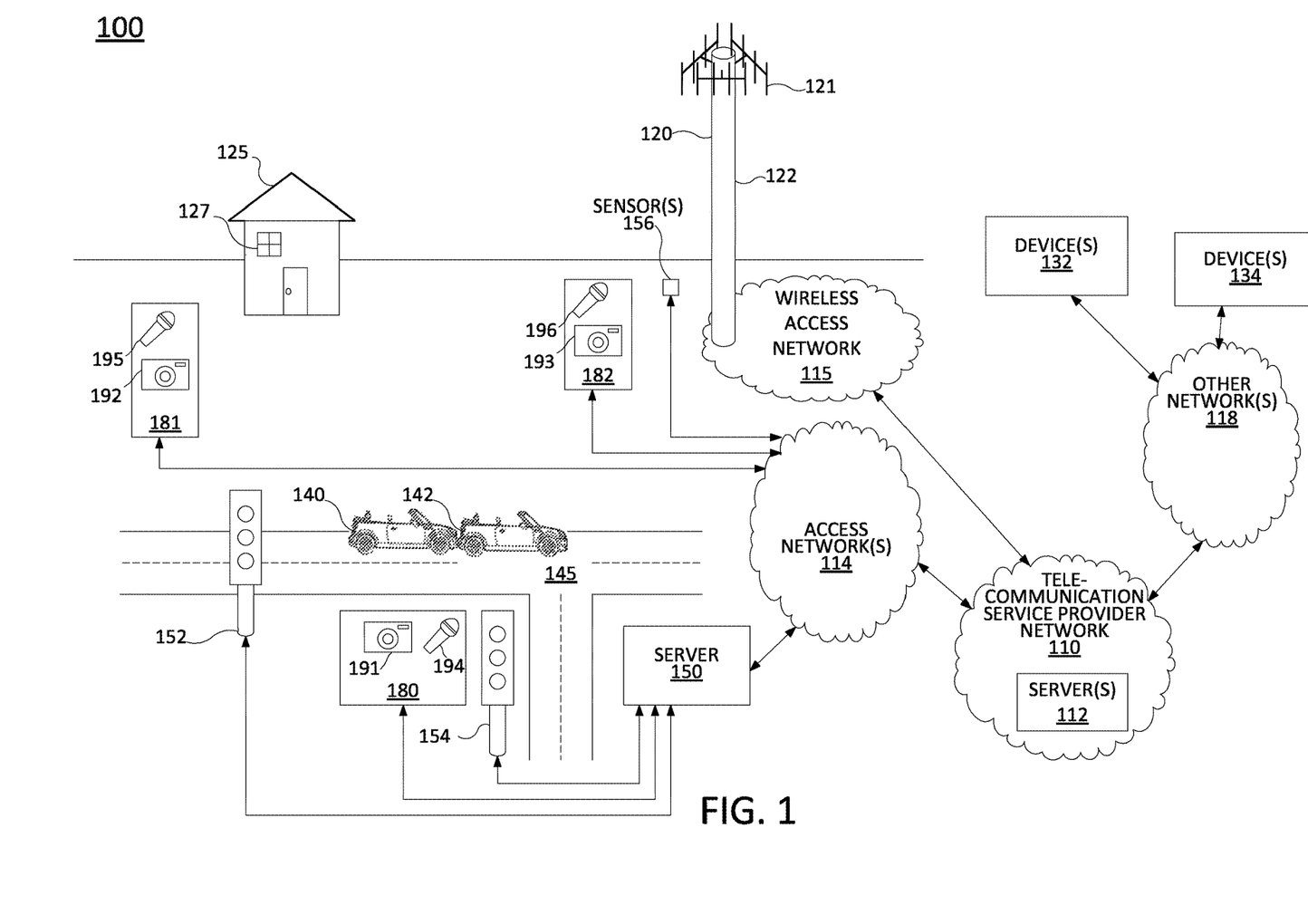
FIG. 1 illustrates an example system related to the present disclosure.

To aid in understanding the present disclosure, FIG. 1 illustrates a block diagram depicting one example of an environment 100 suitable for performing or enabling the steps, functions, operations, and/or features described herein. As illustrated in FIG. 1, the environment 100 includes a telecommunication service provider network 110.

In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

The telecommunication service provider network 110 may be in communication with one or more access networks. For instance, wireless access network 115 may comprise a cellular network (e.g., a Universal Mobile Telecommunications System (UMTS) terrestrial radio access network (UTRAN), an evolved UTRAN (eUTRAN), a base station subsystem (BSS), e.g., a Global System for Mobile communication (GSM) radio access network (GRAN), a 2G, 3G, 4G and/or 5G network, a Long Term Evolution (LTE) network, and the like). In such examples, telecommunication service provider network 110 may include evolved packet core (EPC) network components, network switching subsystem (NSS)/GSM core network and/or General Packet Radio Service (GPRS) core network components, and so forth. Thus, in one example, wireless access network 115 may include at least one cell tower 120, which may alternatively comprise a cellular base station, such as a base transceiver station (BTS), a NodeB, an evolved NodeB (eNodeB), and the like, a non-cellular wireless access point, and so forth. Cell tower 120 may include antenna arrays 121 (e.g., remote radio heads (RRHs)), a mast 122, and other components (not shown). The telecommunication service provider network 110 and the wireless access network 115 may be operated by different service providers, or by a same service provider.

In one example, telecommunication service provider network 110 is connected to other networks 118. In one example, other networks 118 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 118 may include different types of networks. In another example, the other networks 118 may be the same type of network. In one example, the other networks 118 may represent the Internet in general.

In one example, telecommunication service provider network 110 is also connected to access networks 114. The access networks 114 may include a wireless access network (e.g., an IEEE 802.11/Wi-Fi network and the like), a Wide Area Network (WAN), a cellular access network, such as an evolved Universal Terrestrial Radio Access Network (eU-TRAN) that includes one or more eNodeBs, a PSTN access network, a cable access network, a digital subscriber line (DSL) network, a metropolitan area network (MAN), other types of wired access networks, an Internet service provider (ISP) network, and the like. Alternatively, or in addition, access networks 114 may represent corporate, governmental or educational institution LANs, a home/residential LAN, and the like. In one embodiment, the access networks 114 may all be different types of access networks, may all be the same type of access network, or some access networks may be the same type of access network and other may be different types of access networks. The other networks 118, the access networks 114, wireless access network 115, and the telecommunication service provider network 110 may be operated by different service providers, the same service provider, or a combination thereof. The other networks 118, the access networks 114, wireless access network 115, and the telecommunication service provider network 110 may be interconnected via one or more intermediary networks (not shown) which may utilize various different protocols and technologies for transporting communications in the form of data packets, datagrams, protocol data units (PDUs), and the like, such as one or more IP/MPLS networks, on or more frame relay networks, one or more ATM networks, and so forth.

The example of FIG. 1 further includes several media sources 180-182 which may include cameras 191-193 (e.g., video cameras, cameras to capture sequences of still images, etc.) and microphones 194-196. The media sources 180-182 may generate streams of media content comprising still images, audio, and/or video. Further illustrated in FIG. 1 is an server 150 which may comprise all or a portion of a computing device or system, such as computing system 300, and/or processing system 302 as described in connection with FIG. 3 below, and may be configured to perform various steps, functions, and/or operations in connection with examples of the present disclosure for routing media streams to destination devices based upon semantic contents detected in the media streams.

Figure 3:
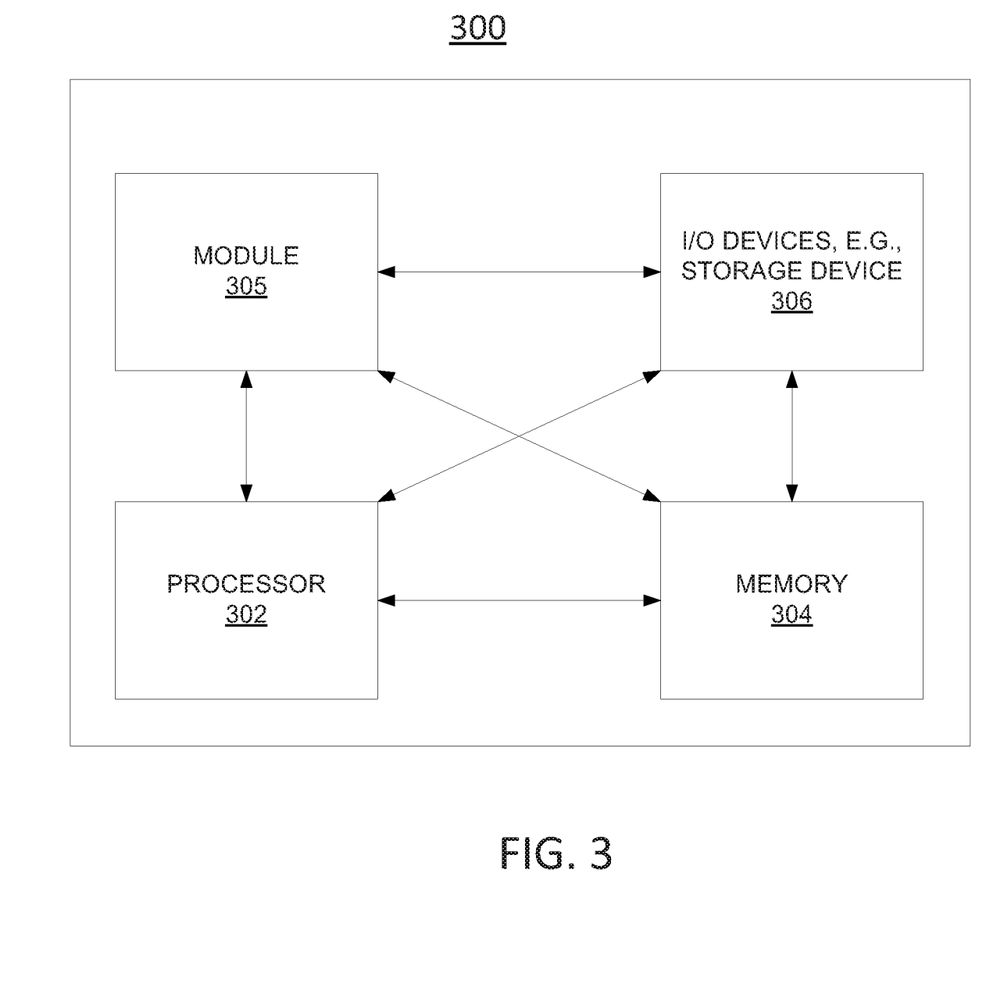
FIG. 3 illustrates an example high-level block diagram of a computing device specifically programmed to perform the steps, functions, blocks, and/or operations described herein.

It should be noted that the terms "configure" and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Figure 2:
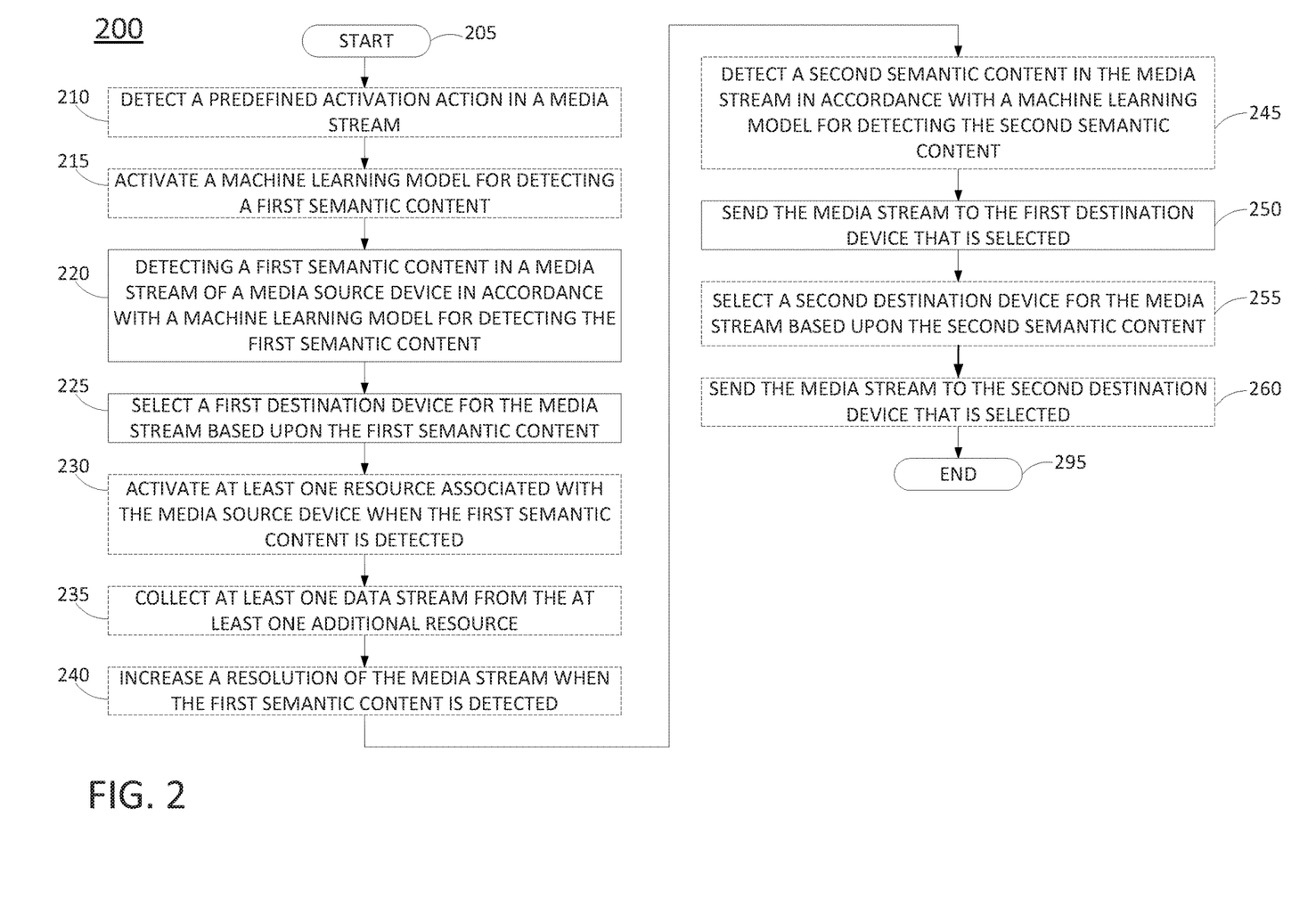
FIG. 2 illustrates a flowchart of an example method for routing media streams to destination devices based upon semantic contents detected in the media streams.

In one example, the server 150 may collect and process media content from one or more of the media sources 180-182. In the present example, server 150 may be connected to media source 180, or may receive media content from media source 181 and/or media source 182 via one or more of the access networks 114. In particular, media sources 180-182 may provide media content that may be used by server 150 to perform operations for routing media streams to destination devices based upon semantic contents detected in the media streams, in accordance with the present disclosure. An example method for routing media streams to destination devices based upon semantic contents detected in the media streams is illustrated in FIG. 2 and discussed in greater detail below. The communications between media sources 180-182 and server 150 may comprise Transmission Control Protocol (TCP)/IP packets, User Datagram Protocol (UDP)/IP packets, other types of protocol data units (PDUs), and so forth. In addition, video streams may be in various formats, such as Moving Picture Expert Group (MPEG) .mpeg files, .mov files, .mp4 files, .3gp files, .f4f files, .m3u8 files, or the like. Similarly, audio streams may be in various formats, such as .wav files, .mp3 files, .flac files, and so forth.

As illustrated in FIG. 1, the media source 180 (e.g., camera 191 and microphone 194) may be directed at a roadway 145 and may capture a video or a sequence of images which may be relayed to server 150. In the present example, the video stream may include imagery of a crash between cars 140 and 142 which may be identified as a semantic content in the video stream by server 150. For instance, a semantic content signature (e.g., a machine learning model) for "car accident" may be deployed as a filter by server 150 to process a video stream from camera 191 of the media source 180. It should be noted that server 150 may also receive and process video streams from other media sources directed at roadway 145, and/or other media sources directed at other roadways. However, for illustrative purposes, only a single media source 180 is illustrated as being directed at roadway 145.

Server 150 may apply any number of signatures as filters to detect different semantic contents in a media stream from media source 180 and/or one or more other media sources, in accordance with the present disclosure. When a portion of a media stream is a match to one of the filters (i.e., to one of the signatures), server 150 may then reroute the media stream in accordance with one or more actions associated with the signature. In particular, each of the signatures may have one or more actions associated therewith. For instance, a general routing of a media stream from media source 180 may be to a traffic monitoring server for storing the last 30 minutes of the media stream and/or to a web server for providing a traffic camera service to the general public. In such an example, the traffic monitoring server and web server may be represented by devices 132.

However, the signature for "car accident" may be associated with the action of "reroute to highway authority command center." The server 150 may store the associations of one or more signatures and respective actions in a database that may be accessed when there is a semantic content matching a signature that is detected in the media stream. In the present example, the highway authority command center may be represented by devices 134. Accordingly, when the semantic content of "car accident" is detected in the media stream from media source 180, the server 150 may redirect the media stream from device(s) 132 to device(s) 134. The signature for "car accident" may further be associated with other actions (e.g., in addition to rerouting) such as, "deploy drone to location" or "redirect drone to location," "activate additional sensors," "route additional sensor data to highway authority command center," "activate traffic signal," "alter traffic signal," and so forth. For instance, the traffic signals 152 and 154 may be changed to blinking yellow lights to signal to other motorists that there may be an accident in the vicinity and to use caution.

In another example, server 150 may gather images, video, and/or audio from media source 181 (e.g., camera 192 and microphone 195). For instance, media source 181 may be directed at building 125. In such an example, the server 150 may deploy one or more filters comprising semantic content signatures to process additional media streams from media source 181. To illustrate, a semantic content signature of "broken window" may comprise features relating to the sound of breaking glass, the image of a broken window 127 contrasted to an image of a non-broken window, and so forth. In any case, when the semantic content of "broken window" is detected in the media stream from media source 181, the server 150 may redirect the media stream in accordance with one or more associated actions. For example, a typical or default routing of the media stream from media source 181 may be to a cloud storage server (e.g., represented by one or more of devices 132) storing 24 hours of the media stream for a homeowner. However, an associated action for the semantic content of "broken window" may be to reroute the media stream (e.g., redirect and/or send an additional copy of the media stream) to a home security monitoring service and/or to a law enforcement agency (e.g., represented by one or more of devices 134). In one example, other media sources that may be deployed and directed at other buildings may feed media streams to server 150 to determine if any when patterns in such media streams match the semantic content signature(s) and to be rerouted accordingly.

Other actions associated with the semantic content signature for "broken window" may be to adjust a network-connected thermostat, e.g., so as to not heat or cool air that is simply being exchanged with the outside through the broken window. In one example, an additional action associated with the semantic content signature of "broken window" may be to activate one or more additional devices, such as turning on an additional camera facing the building 125 from a different vantage point, turning on an additional camera that is outward facing from building 125, reorienting a camera, closing an automated door or a gate on the property of building 125, turning on a spotlight, and so forth. With respect to the media stream from media source 181, the semantic content signature(s) and the associated actions (e.g., rerouting and other actions) may be selected by an owner or manager of building 125, by a home security monitoring service, or by a combination thereof. For instance, server 150 may provide a premises security monitoring service that is preprogrammed with the semantic content signature of "broken window" and a default action of "reroute to monitoring station of premises security monitoring service" (e.g., one of devices 134). However, an owner of building 125 may additionally select to have the media stream rerouted to a device of the building owner, to adjust the thermostat (along with a selection of temperatures or ranges for adjustment), and so forth.

In still another example server 150 may receive a media stream from media source 182 (e.g., images, video, and/or audio from camera 193 and/or microphone 196). For instance, media source 182 may be directed at a cell tower 120, which may include antenna arrays 121, a mast 122, and other components (not shown). In one example, the media stream from media source 182 may include imagery of one of the antenna arrays 121 being missing, one of the antenna arrays 121 being out of a normal position, etc. In such an example, the server 150 may deploy one or more filters comprising semantic content signatures to process a media stream from media source 182. For instance, a semantic content signature of "trespassing" may comprise features relating to the presence of humans in imagery of the cell tower 120. In another example, a semantic content signature of "leaning antenna arrays" may relate to imagery of antenna arrays 121 being out of a proper vertical orientation or alignment, e.g., having been affected by a weather event, a moving object or an animal.

In one example, server 150 may detect the semantic content of "trespassing" in an image stream from camera 193, which may cause server 150 to redirect the media stream from a cloud storage server (e.g., represented by one or more of devices 132) storing 24 hours of the media stream to alternatively or additionally be sent to a network infrastructure monitoring center (e.g., represented by one or more of devices 134). In one example, the detection of the semantic content of "trespassing" in the image stream may also cause server 150 to activate and collect data from microphone 196. For instance, to conserve resources and network bandwidth, media source 182 may only stream a sequence of images from camera 193 to server 150. However, when the semantic content is detected in the image stream, the microphone 196 may be activated to obtain an audio stream, which may be used to confirm the existence of a trespassing situation, e.g., through the activation of an additional semantic content signature of "trespassing" relating to the audio stream, or through streaming the images and audio from media source 182 to the network infrastructure monitoring center where a human operator may confirm the situation. In still another example, the action(s) associated with the semantic content signature of "trespassing" may include sending an instruction to media source 182 to switch camera 193 from generating an image stream (e.g., snapshots from 10 second intervals) to generating a full video stream.

Similarly, in one example, the detection of the semantic content of "leaning antenna arrays" in the media stream from media source 182 may cause server 150 to redirect the media stream from a cloud storage server (e.g., represented by one or more of devices 132) storing 24 hours of the media stream to a network infrastructure monitoring center (e.g., represented by one or more of devices 134). In one example, the detection of the semantic content of "leaning antenna arrays" in the media stream may also cause server 150 to activate and collect data from one or more sensors 156. For instance, sensors 156 may include a wind speed sensor which may provide useful data that a possible antenna orientation problem may involve high winds. In such an example, the redirection of the media stream to one of the devices 134 may also include causing the corresponding wind speed measurements to be transmitted to the one of devices 134, either through the server 150 or directly (i.e., without routing the communications through the server 150). Alternatively, or in addition, sensors 156 may collect measurements continuously, but may only report the measurements in response to a request from server 150. For instance, sensors 156 may collect and store 24 hours of measurements. Thus, when server 150 determines that there is media content that matches the signature for "leaning antenna arrays," the server 150 may then request the sensor measurements from sensors 156 for the same time period during which the signature is detected.

It should be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, the operations described above with respect to server 150 may alternatively or additionally be performed by a device, or a plurality of devices in telecommunication service provider network 110, access networks 114, other networks 118, and so forth, such as servers 112. In another example, the operations described above with respect to server 150 may alternatively or additionally be performed by media sources 180-182. For example, each of media sources 180-182 may comprise all or a portion of a computing device or system, such as computing system 300, and/or processing system 302 as described in connection with FIG. 3 below, and may be configured to perform various steps, functions, and/or operations in connection with examples of the present disclosure for routing media streams to destination devices based upon semantic contents detected in the media streams. For instance, media sources 180-182 may be configured to route and reroute media streams in accordance with actions associated with semantic content signatures, as described herein.

In one example, a first device may apply a semantic content signature to detect a semantic content in a media stream, a second device may select a rerouting of the media stream in response to a notification of the detection of the semantic content, a third device may take additional actions (such as activating a sensor, activating additional cameras or microphones, activating traffic signals, etc.) in response to the detection of the semantic content, and so forth. In addition, although media sources 180-182 are illustrated in a wire-based networking deployment, in other, further, and different examples, any one or more of media sources 180-182 may alternatively or additionally be equipped for wireless communication. For example, media source 182 may capture media content relating to the cell tower 120 in addition to transmitting the media content to other network-based devices via the same cell tower 120. Thus, these and other modifications are all contemplated within the scope of the present disclosure.

FIG. 2 illustrates a flowchart of an example method 200 for routing media streams to destination devices based upon semantic contents detected in the media streams. In one example, steps, functions and/or operations of the method 200 may be performed by server 150, one of the servers 112 and/or one of media sources 180-182 of FIG. 1, or any one or more of such devices in conjunction with one another and/or with other components, such as sensors 156, devices 132, devices 134, and so forth. In one example, the steps, functions, or operations of method 200 may be performed by a computing device or processing system 300, and/or processor 302 as described in connection with FIG. 3 below. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, e.g., comprising a control system, and/or control system in conjunction with other components. For illustrative purposes, the method 200 is described in greater detail below in connection with an example performed by a processing system. The method begins in step 205 and may proceed to optional step 210, to optional step 215, or to step 220.

At optional step 210, the processing system may detect a predefined activation action or trigger event, e.g., a gesture, in the media stream. For instance, the processing system may be configured to detect certain gestures (e.g., hand gestures, arm gestures, foot gestures, leg gestures, full or partial body gestures, face gestures, and the like) in a media stream (e.g., in a stream of video or images). The gesture may represent a predefined command to perform one or more actions.

At optional step 215, the processing system may activate a machine learning model (MLM) for detecting a first semantic content, in response to detecting the gesture in the media stream. In particular, the gesture may represent a command to the processing system to begin looking for one or more particular semantic contents in the media stream and to take further action(s) in response to the detection of such semantic content(s). To illustrate, an always-on camera in a home may generate a video stream with parents and children, where the parents may decide that certain portions of the video (e.g., including specific semantic contents) should be streamed to grandparents. Accordingly, in one example, a predefined gesture may activate the MLM for semantic content detection. Then, the processing system may look for specific semantic contents, such as a given grandchild's face, and only then may an associated routing action be taken, e.g., to only route the media stream to grandparents when the grandchild is detected in the video.

At step 220, the processing system detects a first semantic content in a media stream of a media source device in accordance with a machine learning model (MLM) for detecting the first semantic content. For example, the MLM may comprise a plurality of features of a feature space representing the media stream. The plurality of features may include visual features, audio features, or both video and audio features. Visual features may include low-level invariant image data, changes with images and between images in a sequence (e.g., video frames or a sequence of still image shots), such as color histogram differences or a change in color distribution, a recognized object, a length to width ratio of an object, a velocity of an object estimated from a sequence of images (e.g., video frames), and so forth. Audio features may include low-level features such as: spectral centroid, spectral roll-off, signal energy, and so forth. Audio features may also include high level features, such as identified words and phrases, identified noises of a particular source, e.g., a certain animal call, a plane, a helicopter, an automobile, etc. The MLM may comprise at least one of: a deep neural network (DNN), a generative adversarial network (GAN), a k-nearest neighbor (KNN) predictive model, a support vector machine (SVM)-based classifier and/or a distance-based classifier, or the like.

The MLM, or "signature" for the first semantic content may include those features which are determined to be the most distinguishing features of the semantic content, e.g., those features which are quantitatively the most different from what is considered statistically normal or average from a source of the media content and/or from other semantic contents that may be detected via a same system, e.g., the top 20 features, the top 50 features, etc. In one example, the MLM may be activated in response to the detection of a gesture in a video stream in accordance with optional steps 210 and 215.

At step 225 the processing system selects a first destination device for the media stream based upon the first semantic content. In one example, the first destination device is selected based upon a database matching destination devices to semantic contents. For instance, the database may match the MLM to one or more actions including at least the action of the selection of and/or routing to the first destination device in response to the detection of the first semantic content. Other actions may include activating one or more sensors, collecting data from such sensors, forwarding the data/measurements from such sensors to the first destination device and/or one or more other destination devices, increasing a resolution of the media stream, activating additional MLMs for detecting additional semantic contents, and so forth. In one example, the first media source device is one of a plurality of media source devices and the database further identifies which semantic contents are to be detected for respective source devices. In addition, the database may identify respective destination devices for routing media streams from respective source devices when different semantic contents are detected in the respective media streams.

At optional step 230, the processing system may activate at least one resource associated with the media source device when the first semantic content is detected. For instance, the at least one resource may comprise one or more of a light, an automated door, an automated window, an automated barricade, a loudspeaker, a display screen, a sensor, and so forth. The sensor may comprise, for example, a wind sensor, a humidity sensor, a light sensor, and so forth. In various examples, automated doors, windows, or barricades may be controlled depending upon the network-connectivity and availability of such resources to be addressed by the processing system, and depending upon the nature of the particular semantic content(s) that are being detected (e.g., the detection of particular individuals, the detection of trespassing in general, the detection of particular objects, e.g., a certain type of vehicle, a type of animal, and so forth).

The at least one resource may alternatively or additionally comprise a microphone and/or a camera. For instance, the media stream from the media source device may initially comprise an audio stream, while a camera may be activated at optional step 230 to additionally capture images and/or video. In another example, the media stream from the media source device may initially comprise a video stream (without audio), while a microphone may be activated at optional step 230 to additionally capture audio data.

At optional step 235, the processing system may collect at least one data stream from the at least one additional resource, where the sending the media stream to the first destination device further includes sending the at least one data stream from the at least one additional resource to the first destination device. For instance, the processing system may perform optional step 235 when the at least one additional resource that may be activated at optional step 230 comprises a sensor, a camera, a microphone, or the like.

At optional step 240, the processing system may increase a resolution of the media stream when the first semantic content is detected. For instance, the processing system may initially send the media stream to a server to store the last 30 minutes recorded, the last 24 hours recorded, etc. To conserve network bandwidth and/or storage resources, the media source may provide the media stream at a first resolution, or the processing system may downsample, compress, or otherwise reduce the size of the media stream. However, when a semantic content is detected, it may signify an event or object of interest and the quality of the media stream may be increased. For instance, the resolution of images or video may be increased (e.g., from 640×480 to 1280×960, and so on) at the media source device (e.g., a camera), or may be increased in the media stream as it is further transmitted by the processing system to one or more destination devices.

At optional step 245, the processing system may detect a second semantic content in the media stream in accordance with a machine learning model (MLM) for detecting the second semantic content. The MLM for detecting the second semantic content may be similar to the MLM for detecting the first semantic content. However, it may have different weights or values attached to different features of a feature space representing the media stream so as to represent the different semantic content. In one example, the MLM for detecting the second semantic content is activated in response to the detecting the first semantic content in the media stream. For instance, in one example the first semantic content may be "human presence" while the second semantic content may be "weapon," "lion," or any number of semantic contents. For instance, in one example, the processing system may be configured to reroute a media stream when the presence of a potential bad actor is detected in the media stream, where the problem is broken down into first detecting "human presence" and then detecting "weapon." In additional examples, there may be an always on camera directed at particular enclosure at a zoo. The presence of a human may be uneventful when the enclosure is supposed to be empty. However, if personnel accidentally allow a dangerous animal to remain within the enclosure, the simultaneous presence of a human with the dangerous animal may be an emergency that results in the routing of the media stream to one or more appropriate recipients (e.g., zoo management or security personnel). In still another example, a camera may be directed at a field where a controlled crop burn is taking place. The first semantic content may comprise "fire" and the second semantic content may comprise "human." Thus, for instance, the detection of a fire alone may be insufficient to constitute an emergency, since the fire is intended. However, the simultaneous presence of one or more people in the vicinity of the fire may result in redirecting the video feed to one or more appropriate recipients (e.g., a fire rescue unit, a property manager or owner, etc.).

At step 250 the processing system sends the media stream to the first destination device that is selected. The media stream is sent to the first destination device in response to detecting the first semantic content. In addition, in one example, the media stream is sent to the first destination device in response to detecting both the first semantic content at step 220 and a second semantic content at optional step 245. In one example, the processing system is deployed in a local network. For instance, the processing system may be deployed in a personal computer or other devices at a home or business premises. In one example, the processing system may comprise or be integrated with the media source device. In such examples, the media stream may not be transmitted externally from the media source device and/or from the local network unless and until the first semantic content, and in some cases both the first semantic content and the second semantic content, is/are detected in the media stream. In another example, the processing system is deployed in a telecommunication service provider network. In such an example, the media stream may not be transmitted beyond the processing system unless and until the first semantic content, and in some cases both the first semantic content and the second semantic content, is/are detected in the media stream. In another example, the processing system may route the media stream to one or more different destination devices prior to detecting the first semantic content, and may redirect or send an additional copy of the media stream to the first detection device in response to the detection of the first semantic content (and in some cases, in response to the detection of both the first semantic content and the second semantic content).

At optional step 255, the processing system may select a second destination device for the media stream based upon the second semantic content. It should be noted that in one example, routing to the first destination device may be based upon detection of both the first semantic content and the second semantic content. However, in another example, the media stream may be routed to at least the first destination device when the first semantic content is detected and routed to one or more additional destination devices (e.g., the second destination device) when the second semantic content is detected in the same or a different portion of the media stream. For instance, a video stream from a natural setting may contain imagery that is of interest to scientists studying bears and well as birds. Thus, the detection of the respective semantic contents of "bear" and "egret" may result in routing of the same media stream to entirely different destination devices.

At optional step 260, the processing system may send the media stream to the second destination device that is selected. For instance, optional step 260 may comprise the same or similar operations as described above in connection with step 250.

Following step 250, or any of the optional steps 255-260, the method 200 may proceed to step 295. At step 295, the method 200 ends.

It should be noted that the method 200 may be expanded to include additional steps or may be modified to include additional operations with respect to the steps outlined above. For example, the method 200 may be expanded to include reverting a routing of the media stream to one or more default destination devices or to cease routing of the media stream to the first destination device after a certain period of time has passed and/or after the first semantic content is no longer detected in the media stream. In one example, steps 220-250 and/or steps 220-260 may be repeated through multiple iterations. In addition, the method 200 may be expanded to include detecting any number of semantic contents in the media stream and sending the media stream to one or several destination devices. In another example, the method 200 may be expanded to include detecting semantic contents in different media streams. For instance, the processing system may provide a service to various subscribers for monitoring different media streams, for detecting various types of semantic contents, and so forth.

In another example, the method 200 may be expanded to include learning regular actions in response to certain semantic contents in one or more media streams, and then including a suggested course of action to a person or entity that is responsible for configuring the processing system, e.g., the MLMs/signatures for different semantic contents, the associated actions, and so forth. In still another example, the method 200 may be expanded to include automatically implementing one or more actions that are learned as a response pattern. For instance, if a recipient often activates a sensor in the vicinity of the media source when the recipient receives the media stream in response to the detection of the first semantic content, for subsequent detections of the first semantic content in the media stream, the processing system may automatically activate the sensor and additionally stream the sensor data to the recipient. Thus, these and other modification are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Furthermore, the capturing and dissemination of any of the captured video and/or audio are only performed in full compliance with the pertinent privacy rules and policies that are in effect at the time. In other words, the captured video and/or audio of individuals would only be done with the permission of the individuals (e.g., opting-into a service with full notice of the potential actions of capturing and dissemination of video and/or audio) or as permitted by law.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for routing media streams to destination devices based upon semantic contents detected in the media streams, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for routing media streams to destination devices based upon semantic contents detected in the media streams (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for routing media streams to destination devices based upon semantic contents detected in the media streams (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processing system including at least one processor, a first semantic content in a media stream of a media source device in accordance with a first machine learning model for detecting the first semantic content, wherein the media source device is one of a plurality of media source devices;
   detecting, by the processing system, a second semantic content in the media stream in accordance with a second machine learning model for detecting the second semantic content, wherein the second machine learning model for detecting the second semantic content is activated in response to the detecting the first semantic content in the media stream, and wherein the second machine learning model for detecting the second semantic content is applied to a look-back time period of the media stream that is prior to a time of the media stream at which the first semantic content is detected, wherein the second semantic content is different from the first semantic content;
   selecting, by the processing system, a first destination device for the media stream based upon the first semantic content and the second semantic content that are detected, wherein the first destination device is selected based upon a database matching destination devices to semantic contents, wherein the database further matching media source devices of the plurality of media source devices to the destination devices and semantic contents; and
   sending, by the processing system, the media stream to the first destination device that is selected.

2. The method of claim 1, further comprising:
   activating, by the processing system, at least one resource associated with the media source device when the first semantic content is detected.

3. The method of claim 2, wherein the at least one resource comprises at least one of:
   a light;
   an automated door;
   an automated window;
   an automated barricade;
   a loudspeaker;
   a microphone;
   a camera;
   a display screen; or
   a sensor.

4. The method of claim 2, further comprising:
   collecting at least one data stream from the at least one resource, wherein the sending the media stream to the first destination device further includes sending the at least one data stream from the at least one resource to the first destination device.

5. The method of claim 1, further comprising:
   increasing, by the processing system, a resolution of the media stream when the first semantic content is detected.

6. The method of claim 1, wherein the first destination device is one of a plurality of available destination devices, wherein each of the plurality of available destination devices is associated with at least one of a plurality of different semantic contents.

7. The method of claim 1, further comprising:
   selecting, by the processing system, a second destination device for the media stream based upon the second semantic content; and
   sending, by the processing system, the media stream to the second destination device that is selected.

8. The method of claim 1, further comprising:
   detecting, by the processing system, a predefined activation action in the media stream; and
   activating, by the processing system, the first machine learning model for detecting the first semantic content, in response to the detecting the predefined activation action in the media stream.

9. The method of claim 1, wherein the media stream is sent to the first destination device in response to detecting the first semantic content.

10. The method of claim 1, wherein the processing system is deployed in a local network.

11. The method of claim 1, wherein the processing system is deployed in a telecommunication service provider network.

12. The method of claim 1, wherein the first machine learning model for detecting the first semantic content comprises a plurality of features of a feature space representing the media stream.

13. The method of claim 12, wherein the plurality of features comprises visual features.

14. The method of claim 12, wherein the plurality of features comprises audio features.

15. A non-transitory computer-readable medium storing instructions which, when executed by a processing system including at least one processor, cause the processing system to perform operations, the operations comprising:
   detecting a first semantic content in a media stream of a media source device in accordance with a first machine learning model for detecting the first semantic content wherein the media source device is one of a plurality of media source devices;
   detecting a second semantic content in the media stream in accordance with a second machine learning model for detecting the second semantic content, wherein the second machine learning model for detecting the second semantic content is activated in response to the detecting the first semantic content in the media stream, and wherein the second machine learning model for detecting the second semantic content is applied to a look-back time period of the media stream that is prior to a time of the media stream at which the first semantic content is detected, wherein the second semantic content is different from the first semantic content;
   selecting a first destination device for the media stream based upon the first semantic content and the second semantic content that are detected, wherein the first destination device is selected based upon a database matching destination devices to semantic contents, wherein the database further matching media source devices of the plurality of media source devices to the destination devices and semantic contents; and
   sending the media stream to the first destination device that is selected.

16. A device comprising:
   a processing system including at least one processor; and
   a computer-readable medium storing instructions which, when executed by the processing system, cause the processing system to perform operations, the operations comprising:
      detecting a first semantic content in a media stream of a media source device in accordance with a first machine learning model for detecting the first semantic content wherein the media source device is one of a plurality of media source devices;
      detecting a second semantic content in the media stream in accordance with a second machine learning model for detecting the second semantic content, wherein the second machine learning model for detecting the second semantic content is activated in response to the detecting the first semantic content in the media stream, and wherein the second machine learning model for detecting the second semantic content is applied to a look-back time period of the media stream that is prior to a time of the media stream at which the first semantic content is detected, wherein the second semantic content is different from the first semantic content;
      selecting a first destination device for the media stream based upon the first semantic content and the second semantic content that are detected, wherein the first destination device is selected based upon a database matching destination devices to semantic contents, wherein the database further matching media source devices of the plurality of media source devices to the destination devices and semantic contents; and
      sending the media stream to the first destination device that is selected.

17. The device of claim 16, wherein the operations further comprise:
   activating at least one resource associated with the media source device when the first semantic content is detected.

18. The device of claim 17, wherein the at least one resource comprises at least one of:
   a light;
   an automated door;
   an automated window;
   an automated barricade;
   a loudspeaker;
   a microphone;
   a camera;
   a display screen; or
   a sensor.

19. The device of claim 17, the operations further comprising:
   collecting at least one data stream from the at least one resource, wherein the sending the media stream to the first destination device further includes sending the at least one data stream from the at least one resource to the first destination device.

20. The device of claim 16, the operations further comprising:
   increasing a resolution of the media stream when the first semantic content is detected.

* * * * *